US012683225B2

(12) United States Patent
Yang et al.

(10) Patent No.: US 12,683,225 B2
(45) Date of Patent: Jul. 14, 2026

(54) BATTERY PACK WITH FILLING MATERIAL AND SUPPORTS AND MANUFACTURING METHOD THEREFOR

(71) Applicant: LG ENERGY SOLUTION, LTD., Seoul (KR)

(72) Inventors: Jin Oh Yang, Daejeon (KR); Hae Won Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 601 days.

(21) Appl. No.: 18/026,269

(22) PCT Filed: Oct. 21, 2021

(86) PCT No.: PCT/KR2021/014848
§ 371 (c)(1),
(2) Date: Mar. 14, 2023

(87) PCT Pub. No.: WO2022/086235
PCT Pub. Date: Apr. 28, 2022

(65) Prior Publication Data
US 2023/0369696 A1 Nov. 16, 2023

(30) Foreign Application Priority Data

Oct. 22, 2020 (KR) ........................ 10-2020-0137511

(51) Int. Cl.
H01M 50/213 (2021.01)
H01M 10/04 (2006.01)
(Continued)

(52) U.S. Cl.
CPC ..... H01M 50/213 (2021.01); H01M 10/0422 (2013.01); H01M 10/613 (2015.04);
(Continued)

(58) Field of Classification Search
CPC .. H01M 50/213; H01M 50/60; H01M 50/289; H01M 50/244; H01M 10/613;
(Continued)

(56) References Cited

U.S. PATENT DOCUMENTS

| 2009/0123819 | A1 | 5/2009 | Kim |
| 2012/0258335 | A1 | 10/2012 | Bae |

(Continued)

FOREIGN PATENT DOCUMENTS

| CN | 105390639 A | 3/2016 |
| CN | 108987664 A | 12/2018 |

(Continued)

OTHER PUBLICATIONS

International Search Report (with partial translation) and Written Opinion dated Feb. 7, 2022, issued in corresponding International Patent Application No. PCT/KR2021/014848.

(Continued)

*Primary Examiner* — Jimmy Vo
(74) *Attorney, Agent, or Firm* — Morgan, Lewis & Bockius LLP

(57) ABSTRACT

A battery pack includes a frame having an inner space; a plurality of battery cells each having one end disposed in the inner space of the frame and the other end protruding to an outside the frame; a cell holder at one side of the frame; a heat sink on the cell holder; a plurality of supports in a portion of a space between the battery cells; and a filling material filled in a remaining space in which the supports are not disposed in the space between the battery cells. Here, an amount of the filling material may be adjusted according to the number of the provided supports.

9 Claims, 4 Drawing Sheets

(51) Int. Cl.

| | |
|---|---|
| *H01M 10/613* | (2014.01) |
| *H01M 10/643* | (2014.01) |
| *H01M 10/6551* | (2014.01) |
| *H01M 50/244* | (2021.01) |
| *H01M 50/289* | (2021.01) |
| *H01M 50/60* | (2021.01) |

(52) U.S. Cl.
CPC ..... *H01M 10/643* (2015.04); *H01M 10/6551* (2015.04); *H01M 50/244* (2021.01); *H01M 50/289* (2021.01); *H01M 50/60* (2021.01)

(58) Field of Classification Search
CPC .......... H01M 10/643; H01M 10/6551; H01M 10/0422
See application file for complete search history.

(56) References Cited

U.S. PATENT DOCUMENTS

| | | | |
|---|---|---|---|
| 2013/0183566 A1 | 7/2013 | Wayne et al. | |
| 2018/0198154 A1 | 7/2018 | Lee et al. | |
| 2018/0223070 A1 | 8/2018 | O'Neil et al. | |
| 2019/0083177 A1* | 3/2019 | Brown ................. | A61B 1/0008 |
| 2019/0181400 A1 | 6/2019 | Nakasawa et al. | |
| 2020/0194853 A1 | 6/2020 | Yoo et al. | |
| 2022/0376337 A1 | 11/2022 | Jin et al. | |

FOREIGN PATENT DOCUMENTS

| | | | |
|---|---|---|---|
| CN | 109378549 | A | 2/2019 |
| CN | 209804842 | U | 12/2019 |
| EP | 3989342 | A1 | 4/2022 |
| JP | 2007066773 | A | 3/2007 |
| JP | 2020507194 | A | 3/2020 |
| KR | 10-0949334 | B1 | 3/2010 |
| KR | 10-1256075 | B1 | 4/2013 |
| KR | 10-2017-0000125 | U | 1/2017 |
| KR | 10-2018-0081393 | A | 7/2018 |
| KR | 10-2019-0047499 | A | 5/2019 |
| KR | 10-2019-0132631 | A | 11/2019 |
| WO | 2019/083177 | A1 | 5/2019 |
| WO | 2019-164974 | A1 | 8/2019 |

OTHER PUBLICATIONS

Office Action dated May 26, 2025 issued in corresponding Korean Patent Application No. 10-2020-0137511. (Note: KR 10-2019-0047499 A already submitted.).

Extended European Search Report for European Patent Application No. 21883303.6.

1 Office Action dated Sep. 26, 2025 issued in the corresponding Chinese Patent Application No. 202180038589.2.

* cited by examiner

FIG. 1

VERTICAL
DIRECTION

LEFT AND          FRONT
RIGHT          AND REAR
DIRECTION     DIRECTION

140 : 141, 142, 143

VERTICAL
DIRECTION

LEFT AND        FRONT
RIGHT        AND REAR
DIRECTION      DIRECTION

FRONT AND
REAR DIRECTION

LEFT AND RIGHT
DIRECTION (a)

FRONT AND
REAR DIRECTION

LEFT AND RIGHT
DIRECTION (b)

FIG. 4

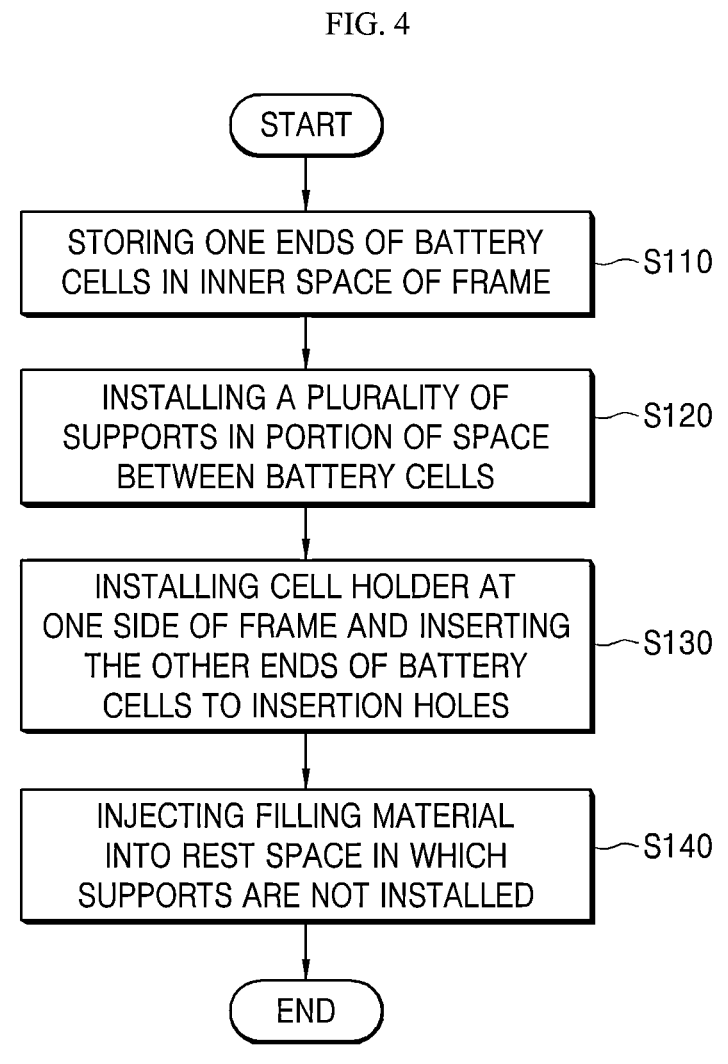

```
                    ┌─────────┐
                    │  START  │
                    └────┬────┘
                         │
                         ▼
        ┌─────────────────────────────────┐
        │  STORING ONE ENDS OF BATTERY     │─── S110
        │  CELLS IN INNER SPACE OF FRAME   │
        └────────────────┬────────────────┘
                         │
                         ▼
        ┌─────────────────────────────────┐
        │  INSTALLING A PLURALITY OF       │
        │  SUPPORTS IN PORTION OF SPACE    │─── S120
        │  BETWEEN BATTERY CELLS           │
        └────────────────┬────────────────┘
                         │
                         ▼
        ┌─────────────────────────────────┐
        │  INSTALLING CELL HOLDER AT       │
        │  ONE SIDE OF FRAME AND INSERTING │
        │  THE OTHER ENDS OF BATTERY       │─── S130
        │  CELLS TO INSERTION HOLES        │
        └────────────────┬────────────────┘
                         │
                         ▼
        ┌─────────────────────────────────┐
        │  INJECTING FILLING MATERIAL      │
        │  INTO REST SPACE IN WHICH        │─── S140
        │  SUPPORTS ARE NOT INSTALLED      │
        └────────────────┬────────────────┘
                         │
                         ▼
                    ┌─────────┐
                    │   END   │
                    └─────────┘
```

BATTERY PACK WITH FILLING MATERIAL AND SUPPORTS AND MANUFACTURING METHOD THEREFOR

BACKGROUND

The present disclosure relates to a battery pack and a manufacturing method thereof, and more particularly, to a battery pack capable of stably supporting and storing battery cells and a manufacturing method thereof.

In general, a battery cell may be repeatedly charged and discharged by an electrochemical reaction of components thereof. A battery pack may include a plurality of battery cells to increase an output voltage or an output current.

Here, since the battery cells of the battery pack are densely arranged, it is important to dissipate heat generated from each of the battery cells. When the heat generated from the battery cells are not properly dissipated in a charge and discharge process, heat accumulation may be generated in the battery pack to overheat the battery cells. Thus, the battery cells may be ignited and exploded.

Typically, when the battery pack is manufactured, a filling material is injected to a space between the battery cells. Since the filling material may fix the battery cells and easily dissipate the heat generated from the battery cells, the filling material may retard or prevent the ignition or explosion of the battery cells. However, the filling material is difficult to be uniformly filled in the entire space between the battery cells, and the filling of the filling material into the space between the battery cells requires much time and costs.

RELATED ART DOCUMENT

[Patent document]
(Patent document 1) KR2019-0132631 A.

SUMMARY

The present disclosure provides a battery pack capable of stably supporting and storing battery cells and a manufacturing method thereof.

The present disclosure also provides a battery pack capable of decreasing a usage amount of a filling material filled in a space between battery cells and a manufacturing method thereof.

In accordance with an exemplary embodiment, a battery pack includes: a frame having an inner space and an opened one side; a plurality of battery cells each having one end disposed in the inner space of the frame and the other end protruding to the outside of one side of the frame; a cell holder having a plurality of insertion holes to which the other ends of the battery cells are respectively inserted and installed at one side of the frame; a heat sink installed on the cell holder to cool the battery cells; a plurality of supports disposed in a portion of a space between the battery cells; and a filling material filled in the rest space in which the supports are not disposed in the space between the battery cells. Here, a filled amount of the filling material is adjusted according to the number of the provided supports.

The support may be formed along a flat surface shape of the space between the battery cells and extend less than a height of the inner space of the frame.

Groups formed as the battery cells are arranged along one direction may be arranged so that the battery cells are arranged in a row along a direction perpendicularly crossing the one direction, and each of the groups may include the same number of battery cells.

Groups formed as the battery cells are arranged along one direction may be arranged so that the battery cells are alternately arranged in a direction perpendicularly crossing the one direction, and the support may have a shape in which a circumference of a flat surface of the support has three sides.

Each of the sides of the circumference of the flat surface of the support may have one of a curved shape or a straight line shape.

The cell holder may be provided in plurality, and a plurality of cell holders may be stacked in a vertical direction.

In accordance with another exemplary embodiment, a method for manufacturing a battery pack includes: storing one ends of battery cells in an inner space of a frame; installing a plurality of supports in a portion of a space between the battery cells; installing a cell holder at one side of the frame and respectively inserting the other ends of the battery cells protruding to the outside of the frame to insertion holes formed in the cell holder; and injecting a filling material into the rest space in which the supports are not installed in the space between the battery cells. Here, the installing of the plurality of supports includes setting the number of provided supports to adjust a filled amount of the filling material.

The setting of the number of provided supports includes installing the supports to occupy 10% or more to 40% or less of a volume of an entire space between the battery cells.

The installing of the cell holder at one side of the frame may include stacking a plurality of cell holders in a vertical direction and coupling the cell holders to the frame.

A material of the filling material may include silicon.

BRIEF DESCRIPTION OF THE DRAWINGS

Exemplary embodiments can be understood in more detail from the following description taken in conjunction with the accompanying drawings, in which:

FIG. 1 is a perspective view illustrating a battery pack in accordance with an exemplary embodiment;

Figure 3:
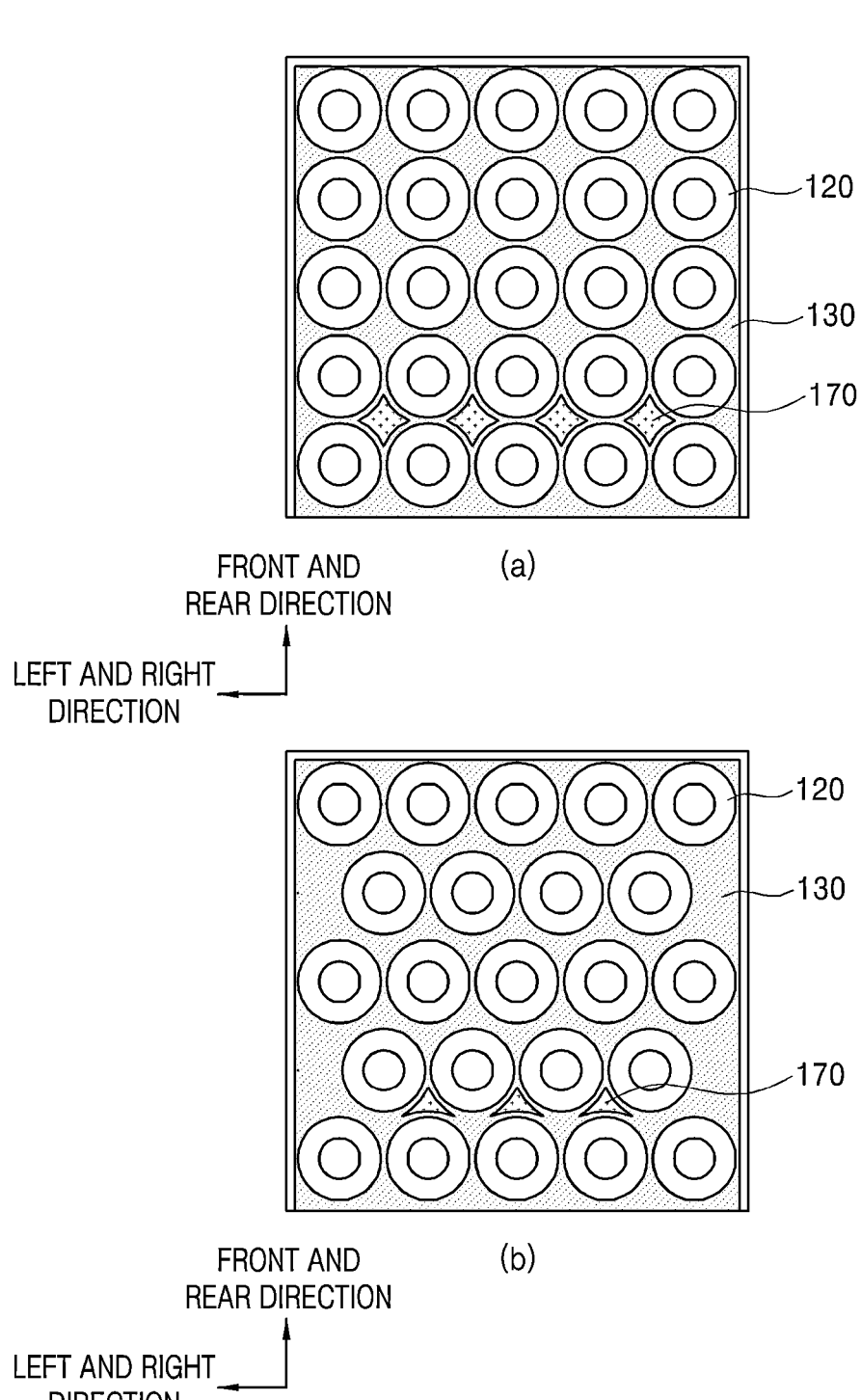

(a) of FIG. 3 is a plan view illustrating an installation structure of supports in accordance with an exemplary embodiment;

(b) of FIG. 3 is a plan view illustrating an installation structure of supports in accordance with another exemplary embodiment; and FIG. 4 is a flowchart representing a method for manufacturing a battery pack in accordance with an exemplary embodiment.

DETAILED DESCRIPTION OF EMBODIMENTS

Hereinafter, specific embodiments will be described in detail with reference to the accompanying drawings. The present disclosure may, however, be embodied in many different forms and should not be construed as being limited to the embodiments set forth herein; rather, these embodiments are provided so that this disclosure will be thorough and complete, and will fully convey the concept of the invention to those skilled in the art. In the figures, the dimensions of layers and regions are exaggerated for clarity of illustration, and like reference numerals refer to like elements throughout.

Figure 1:
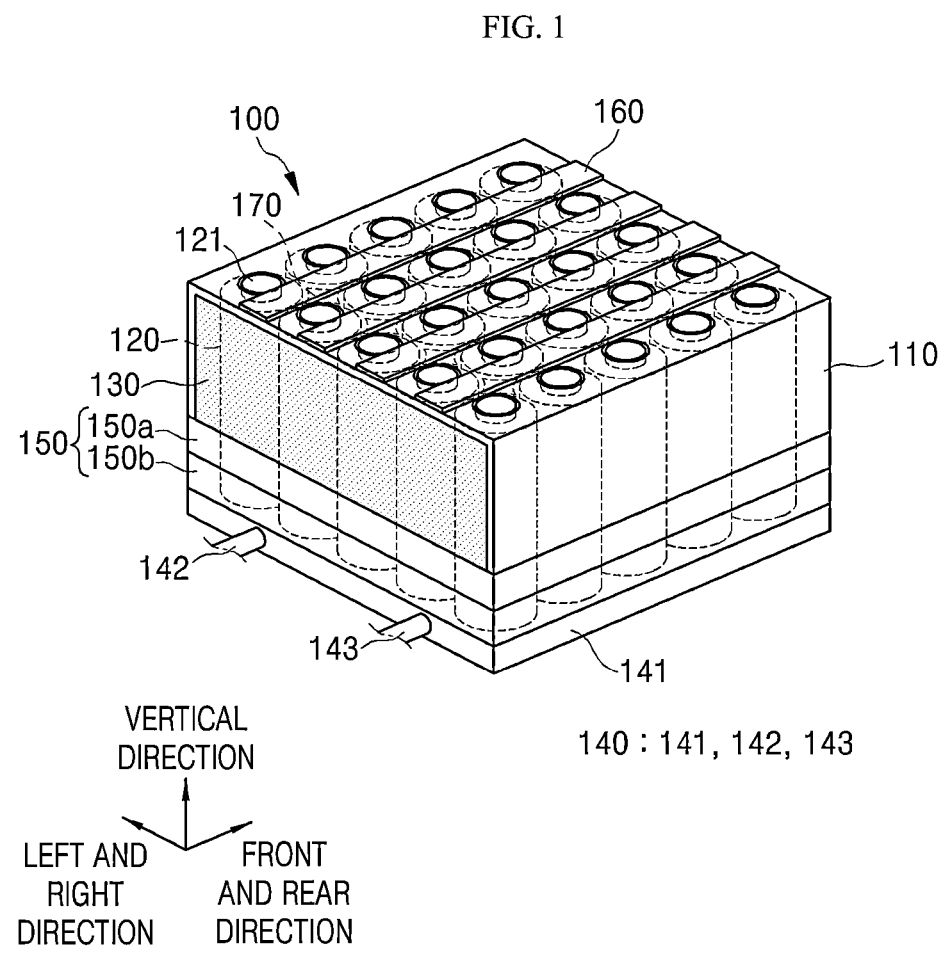
Figure 2:
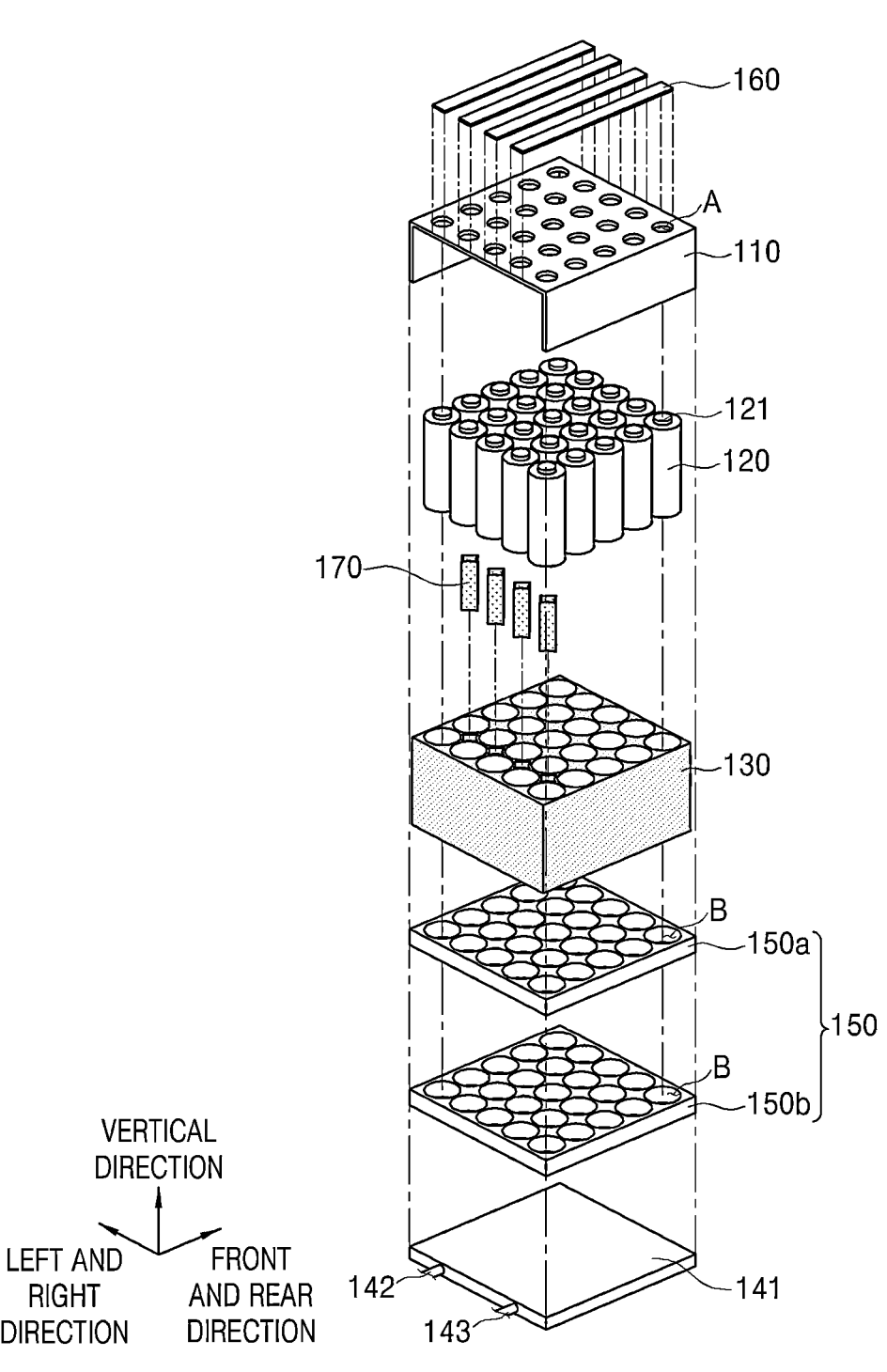
FIG. 2 is an exploded perspective view illustrating a structure of the battery pack in accordance with an exemplary embodiment.

FIG. 1 is a perspective view illustrating a battery pack in accordance with an exemplary embodiment, FIG. 2 is an exploded perspective view illustrating a structure of the battery pack in accordance with an exemplary embodiment, and FIG. 3 is a plan view illustrating an installation structure of supports in accordance with an exemplary embodiment. Hereinafter, the battery pack in accordance with an exemplary embodiment will be described.

The battery pack in accordance with an exemplary embodiment is a device for supplying power to electronic equipment or system. Referring to FIGS. 1 and 2, a battery pack 100 includes a frame 110, a battery cell 120, a cell holder 150, a heat sink 140, a filling material 130, and a support 170.

The battery cell 120 may have a cylindrical shape. For example, the battery cell 120 may be a secondary battery cell and include a positive electrode collector, a negative electrode collector, a separator, an active material, and an electrolyte. The battery cell 120 may be repeatedly charged and discharged by an electrochemical reaction of the above-described components thereof.

Here, the battery cell 120 may be provided in plurality. The battery cells 120 may be spaced apart from each other at predetermined positions. The battery cells 120 may be electrically connected in series or parallel. Thus, the battery pack 100 may increase an output voltage or an output current.

Also, each of the battery cells 120 may have one end (or upper end) disposed in an inner space of the frame 110 and the other end (or lower end) protruding to the outside of one side (or lower side) of the frame 110. That is, the battery cells 120 may have a length extending in one direction (or vertical direction) greater than that of the frame 110.

The frame 110 may have a chamber shape. For example, the frame 110 may have a cuboid box shape. Thus, the frame 110 may have an inner space for accommodating the battery cells 120.

Here, the frame 110 may have an opened one side (or lower side). For example, as the entire low side of the frame 110 is opened, an opening may be formed. Thus, the battery cells 120 may be entered to the inside of the frame 110 through the opening. Since each of the battery cells 120 has the length in the vertical direction greater than that of the frame 110, the lower end of each of the battery cells 120 may pass through the opening and protrude from the lower side of the frame 110.

Also, a plurality of through-holes A may be defined in the other side (or top surface) of the frame 110. For example, the through-holes A may each have a circular shape and be arranged in the form of a x b. A terminal disposed at the upper end of the battery cell 120 may be inserted to the through-hole A. Thus, as the terminals of the battery cells 120 are inserted to the different through-holes A, respectively, the battery cells 120 may be arranged in the form of a x b based on an array of the through-holes A.

Here, the terminals of the battery cells 120 may be respectively inserted to the through-holes A and exposed to the outside of the frame 110. A busbar 160 may be installed on the frame 110 and connected with the terminals. For example, the busbar 160 may extend in one direction (or front and rear direction) and be provided in plurality, so that a plurality of busbars 160 are spaced apart from each other in the other direction (or left and right direction). Thus, the battery cells 120 spaced apart from each other in one direction may be electrically connected to each other by the busbars 160. However, the exemplary embodiment is not limited to the number of the busbars 160 and the structure of electrically connecting the battery cells 120. For example, the number of the busbars 160 and the structure of electrically connecting the battery cells 120 may be variously provided.

Also, the frame 110 may have an opened one surface (or front surface). Thus, the filling material 130 may be injected to the inner space of the frame 110 through the opened front surface. However, the exemplary embodiment is not limited to the structure and shape of the frame 110. For example, the frame 110 may have various structures and shapes.

The cell holder 150 may have a plate shape. For example, the cell holder 150 may have a rectangular shape along a flat surface shape of the frame 110, and an area of a top surface of the cell holder 150 may be equal to or greater than that of the flat surface of the frame 110. Thus, when the cell holder 150 is installed so that a circumference of the top surface of the cell holder 150 contacts an one side end of the frame 110, the cell holder 150 may cover an entire cross-section (or lower portion) of the inner space of the frame 110. Thus, a lower opening formed in the frame 110 may be sealed by the cell holder 150.

Here, a material of the cell holder 150 may include plastic. Thus, the cell holder 150 may be manufactured at less cost than the filling material 130 made of silicon.

Also, a plurality of insertion holes B may be defined in the cell holder 150. Each of the insertion holes B may be formed along a circumferential shape of the battery cell 120, and an internal diameter of the insertion hole B may be equal to or greater than an external diameter of the battery cell 120. Thus, the other ends of the battery cells 120 may pass through and be inserted to the insertion holes B, respectively.

Here, the insertion holes B may respectively face the through-holes A of the frame 110. That is the insertion holes B may be arranged in the form of a x b based on the array of the through-holes A. Thus, the battery cell 120 may have the upper end inserted to and supported by the through-hole A and the lower end inserted to and supported by the insertion hole B. Thus, the battery cells 120 may maintain a stably fixed state.

Also, the cell holder 150 may be provided in plurality. The cell holders 150 may be stacked to each other between the frame 110 and the heat sink 140. For example, as a first cell holder 150a and a second cell holder 150b are provided, the cell holders 150 may be stacked in a vertical direction and disposed in a spaced space between the frame 110 and the heat sink 140. Thus, a top surface of the first cell holder 150a may be connected to the lower portion of the frame 110, and a bottom surface of the second cell holder 150b may be connected to the heat sink 140. However, the exemplary embodiment is not limited to the number of the cell holders 150. For example, three or more cell holders may be provided instead of two cell holders.

Here, the cell holders 150 may support the battery cells 120 together with the filling material 130. That is, the filling material 130 supports a circumference of the one end (or upper end) of each of the battery cells 120, and each of the cell holders 150 supports a circumference of the other end (or lower end) of each of the battery cells 120 except for the upper end of each of the battery cells 120. Since the filling material 130 is not filled in a space in which the cell holders 150 are disposed, as a portion supported by the cell holders 150 is increased in the battery cell 120, a portion supported by the filling material 130 may be decreased. Thus, a volume of the inner space of the frame 110 and an amount of the filling material 130 filled in the inner space of the frame 110 may be adjusted according to the number of staked cell holders 150.

For example, when the number of the provided cell holders 150 is increased, the volume of the inner space of the frame 110 may be decreased, and when the number of the provided cell holders 150 is decreased, the volume of the inner space of the frame 110 may be increased. Thus, when the volume of the inner space of the frame 110 is decreased, the amount of the filling material 130 filled in the inner space of the frame 110 may be decreased, and when the volume of the inner space of the frame 110 is increased, the amount of the filling material 130 filled in the inner space of the frame 110 may be increased. Thus, the usage amount of the filling material 130 may be decreased by adjusting the stacked number or height of the cell holders 150.

The heat sink 140 may be disposed below the cell holder 150. Thus, the heat sink 140 may directly or indirectly contact the battery cells 120 inserted to the cell holder 150 to cool the battery cells 120. The heat sink 140 may include a cooling member 141, a cooling medium supply member 142, and a cooling medium discharge member 143.

The cooling member 141 may have a plate shape. For example, the cooling member 141 may have a rectangular shape along a flat surface shape of the cell holder 150, and an area of a top surface of the cooling member 141 may be equal to or greater than that of a flat surface of the cell holder 150. Thus, the top surface of the cooling member 141 may directly or indirectly contact all of the battery cells 120.

Also, a flow path through which the cooling medium moves may be formed in the cooling member 141. For example, the cooling medium may be a coolant. Thus, the cooling medium moving along the flow path formed in the cooling member 141 may absorb heat generated from the battery cells 120. Thus, the battery cells 120 may be cooled as a temperature thereof is decreased by the cooling medium.

Here, the cooling member 141 may be made of a material having a high thermal conductivity. For example, the cooling member 141 may be made of aluminum or an aluminum alloy material. Thus, the cooling member 141 may easily transfer the heat generated from the battery cells 120 to the cooling medium. Thus, the temperature of the battery cells 120 may be quickly adjusted.

The cooling medium supply member 142 may be connected to the cooling member 141. For example, the cooling medium supply member 142 may be a line for supplying the cooling medium to the cooling member 141 and connected to one end of the flow path formed in the cooling member 141. Thus, the cooling medium supplied to the one end of the flow path through the cooling medium supply member 142 may absorb the heat of the battery cells 120 while passing through the flow path.

The cooling medium discharge member 143 may be connected to the cooling member 141. For example, the cooling medium supply member 143 may be a line for discharging the cooling medium in the cooling member 141 and connected to the other end of the flow path formed in the cooling member 141. Thus, the cooling medium may move from the one end to the other end of the flow path and be discharged to the outside through the cooling medium discharge member 143. However, the exemplary embodiment is not limited to the structure and shape of the housing 140. For example, the housing may have various structures and shapes.

The filling material 130 may be supplied to the inner space of the frame 100 and filled in the space between the battery cells 120. Since the support 170 is installed in the space between the battery cells 120 in advance, the filling material 130 may be filled in the rest space in which the supports 170 are not disposed in the space between the battery cells 120. Thus, the filling material 130 may hold the upper portions of the battery cells 120 together with the supports 170.

Also, a material of the filling material 130 may include silicon. Thus, the filling material 130 may simultaneously have a thermal conductivity and an adhesive property. Thus, the filling material 130 may be easily formed along a shape of the space between the battery cells 120 to fix the battery cells 120 and transfer the heat generated from the battery cells 120 to the outside.

Here, a feature of providing the filling material 130 to the entire space between the battery cells 120 may require much time and costs. Thus, the usage amount of the filling material 130 may be decreased by including the cell holders 150 and the supports 170.

The support 170 may be provided in plurality and disposed in a portion of the space between the battery cells 120. Since the filling material 130 is also filled in the space between the battery cells 120, a volume of the space in which the filling material 130 is filled may be adjusted according to the number of the provided supports 170, and the amount of the filling material 130 to be injected may be adjusted. That is, when the number of the provided supports 170 is increased, an empty space between the battery cells 120 may be decreased, and the volume of the space filled by the filling material 130 may be decreased. When the number of the provided supports 170 is decreased, the empty space between the battery cells 120 may be increased, and the volume of the space filled by the filling material 130 may be increased.

For example, as illustrated in FIGS. 1 and 2, four supports 170 may be arranged in a row along the left and right direction and disposed between the battery cells 120 of a first column and a second column. Thus, as a space between the battery cells 120 of the first column and the second column is filled by the supports 170, the filling material 130 is filled only between the battery cells 120 of the rest columns except for the space between the battery cells 120 of the first column and the second column. Thus, the usage amount of the filling material 130 may be decreased. However, the exemplary embodiment is not limited to the number or arrangement structure of the provided supports 170. For example, the supports 170 may have various structures and provided numbers.

Also, each of the supports 170 may have a bar shape extending in the vertical direction. The support 170 may extend less than a height of the inner space of the frame 110. For example, the support 170 may be installed on a ceiling surface of the frame 110 and extend downward therefrom or extend upward from the top surface of the cell holder 150. Alternatively, the support 170 may have an upper end connected to the ceiling surface of the frame 110 and a lower end connected to the top surface of the cell holder 150. Thus, the support 170 may be disposed in the inner space of the frame 110.

Here, a flat surface of the support 170 may be formed along a flat surface shape of the space between the battery cells 120. Here, a flat surface area of the support 170 may be equal to or less than that of the space between the battery cells 120. When the flat surface area of the support 170 may be equal to that of the space between the battery cells 120, the support 170 may directly contact the battery cells 120, and when the flat surface area of the support 170 may be less than that of the space between the battery cells 120, the support 170 may indirectly contact the battery cells 120.

Thus, the support 170 may be stably disposed in the empty space between the battery cells 120.

For example, as illustrated in (a) of FIG. 3, the battery cells 120 may be arranged along one direction (or front and rear direction) to form one group. This group may be provided in plurality, and a plurality of groups may be arranged so that the battery cells 120 are arranged in a row in a direction perpendicularly crossing the one direction (or left and right direction). Each of the groups may include the same number of battery cells 120. Here, the support 170 may have a rectangular shape in which a circumference of a flat surface has four sides. Since the battery cells 120 are arranged on the same line along the front and rear direction and the left and right direction, spaces surrounding by four battery cells 120 arranged in a rectangular shape may be formed, and the support 170 may be disposed at each of the spaces surrounding by different battery cells 120. Thus, the four sides of the support 170 may face the different battery cells 120. Accordingly, the sides of the support 170 may respectively directly or indirectly contact the facing different battery cells 120, and one support 170 may support four battery cells 120.

Alternatively, as illustrated in (b) of FIG. 3, the battery cells 120 may be arranged along one direction (or front and rear direction) to form one group. This group may be provided in plurality, and a plurality of groups may be arranged so that the battery cells 120 are alternately arranged in the direction perpendicularly crossing the one direction (or left and right direction). Here, the support 170 may have a triangular shape in which a circumference of a flat surface has three sides. Since the battery cells 120 are arranged on the same line along the front and rear direction and alternately arranged in the left and right direction, spaces surrounding by three battery cells 120 arranged in a triangular shape may be formed, and the support 170 may be disposed at each of the spaces surrounding by different battery cells 120. Thus, the three sides of the support 170 may face the different battery cells 120. Thus, the sides of the support 170 may respectively directly or indirectly contact the facing different battery cells 120, and one support 170 may support three battery cells 120.

Here, each of the sides of the support 170, which form a circumference of a flat surface of the support 170, may have at least one of a curved shape or a straight line shape. When each of the sides of the support 170 has the straight line shape, the support 170 may be easily manufactured. When each of the sides of the support 170 has the curved shape, the sides of the support 170 may form a circumference of the support 170 so that the sides respectively surround a portion of the facing battery cells 120. Thus, the support 170 may more stably support the battery cells 120.

As described above, the battery cells 120 may be supported by installing the plurality of supports 170 in a portion of the space between the battery cells 120. Thus, although the amount of the filling material 130 used to fix the battery cells 120 is decreased, the battery cells 120 may be stably supported. Thus, an efficiency of a process of manufacturing the battery pack 100 may be improved by decreasing the usage amount of the filling material 130.

FIG. 4 is a flowchart representing a method for manufacturing a battery pack in accordance with an exemplary embodiment. Hereinafter, the method for manufacturing the battery pack in accordance with an exemplary embodiment will be described.

The method for manufacturing the battery pack in accordance with an exemplary embodiment relates to a method for stably fixing the battery pack and reducing a usage amount of a filling material. Referring to FIG. 4, the method for manufacturing the battery pack includes: a process S110 of storing one ends of battery cells in an inner space of a frame; a process S120 of installing a plurality of supports in a portion of a space between the battery cells; a process S130 of installing a cell holder at one side of the frame and inserting the other ends of the battery cells protruding to the outside of the frame to insertion holes formed in the cell holder; and a process S140 of injecting a filling material into the rest space in which the supports are not installed in the space between the battery cells.

Referring to FIGS. 1 to 3, one end (upper end) of each of battery cells 120 may be stored in an inner space of a frame 110 in the process S110. That is, the battery cells 120 may be entered to the inner space of the frame 110 through an opened one side (or lower side) of the frame 110, and terminals of the battery cells 120 may be respectively inserted to through-holes A defined in the other side (or top surface) of the frame 110. Thus, the battery cells 120 may be aligned along an arrangement shape of the through-holes A.

Here, each of the battery cells 120 may have a vertical length greater than that of the frame 110. Thus, the battery cells 120 may have the one ends disposed in the inner space of the frame 110 and the other ends (or lower ends) protruding downward and disposed at the outside of the frame 110.

A plurality of supports 170 may be installed in a portion of the space between the battery cells in the process S120. The support 170 may be installed on a ceiling surface of the frame 110 and extend downward therefrom or extend upward from a top surface of the cell holder 150. Alternatively, the support 170 may have an upper end connected to the ceiling surface of the frame 110 and a lower end connected to the top surface of the cell holder 150. Thus, the support 170 may be disposed in the inner space of the frame 110.

Since the filling material 130 is also filled in the space between the battery cells 120, a volume of the space in which the filling material 130 is filled may be adjusted according to the number of the provided supports 170, and the amount of the filling material 130 to be filled may be adjusted. That is, when the number of the provided supports 170 is increased, an empty space between the battery cells 120 may be decreased, and the volume of the space filled by the filling material 130 may be decreased. When the number of the provided supports 170 is decreased, the empty space between the battery cells 120 may be increased, and the volume of the space filled by the filling material 130 may be increased.

For example, four supports 170 may be arranged in a row along the left and right direction and disposed between the battery cells 120 of a first column and a second column. Thus, as a space between the battery cells 120 of the first column and the second column is filled by the supports 170, the filling material 130 is filled only between the battery cells 120 of the rest columns except for the space between the battery cells 120 of the first column and the second column. Thus, the usage amount of the filling material 130 may be decreased.

Here, when the number of the provided supports 170 is set, the supports 170 may be provided to occupy 10% or more to 40% or less of a volume of the entire space between the battery cells 120. When the supports 170 occupy less than 10% of the volume of the entire space between the battery cells 120, the filled amount of the filling material may be slightly decreased, and a feature of filling the filling material 130 may require much time and costs like the related art. When the supports 170 occupy greater than 40% of the volume of the entire space between the battery cells 120, the usage amount of the filling material 130 may be extremely decreased, and the filling material 130 may not stably support the battery cells 120. Thus, the number of the supports 170 may be determined to occupy 10% or more to 40% or less of the volume of the entire space between the battery cells 120 so that the filling material 130 stably supports the battery cells 120 while the usage amount of the filling material 130 is decreased.

Thereafter, a plurality of cell holders 150 may be installed at one side of the frame 110 in the process S130. Thus, the other ends (or lower ends) of the battery cells 120 protruding to the outside of the frame 110 may be respectively inserted to insertion holes B formed in the cell holder 150. Thus, the battery cells 120 may be stably fixed in position as the one ends of the battery cells 120 are disposed in the frame 110, and the other ends are supported by the cell holder 150.

Also, the cell holder 150 may be provided in plurality. Thus, when the cell holders 150 are installed at one side of the frame 110, the cell holders 150 may be coupled to a lower portion of the frame 110 while the cell holders 150 are stacked in a vertical direction. When the cell holders 150 are stacked, the insertion holes B formed in the cell holders 150 may communicate each other to have an increased vertical length. Thus, a portion of the battery cells 120, which is inserted to the insertion holes B communicating each other, may be increased, and a portion of the battery cells 120, which is disposed in the inner space of the frame 110, may be decreased. Thus, a volume of the inner space of the frame 110 may be decreased by decreasing the vertical length of the frame 110 as many as the number of the provided cell holders 150.

For example, when the number of the provided cell holders 150 is increased, the volume of the inner space of the frame 110 may be decreased, and when the number of the provided cell holders 150 is decreased, the volume of the inner space of the frame 110 may be increased. Thus, when the volume of the inner space of the frame 110 is decreased, the amount of the filling material 130 filled in the inner space of the frame 110 may be decreased, and when the volume of the inner space of the frame 110 is increased, the amount of the filling material 130 filled in the inner space of the frame 110 may be increased. Thus, the usage amount of the filling material 130 may be adjusted by setting the number or height of the stacked cell holders 150.

Thereafter, the filling material 130 may be injected to the rest space in which the supports 170 are not installed in the space between the battery cells 120. Thus, the filling material 130 may be supplied between the battery cells 120 to hold the upper end of the battery cells 120.

Here, the volume of the inner space of the frame 110 is decreased by the cell holders 150, and the supports 170 are installed in the inner space of the frame 110 in advance. Thus, the usage amount of the filling material 130 supplied to fill the empty space between the battery cells 120 may be decreased by decreasing the volume of the empty space between the battery cells 120 twice. When the usage amount of the filling material 130 is decreased, a time and costs required to fill the filling material 130 may be decreased. That is, since the filling material 130 is not filled in a space in which the cell holders 150 are stacked and a space in which the supports 170 are not installed, the usage amount of the filling material 130 may be adjusted according to the stacked number or of the cell holders 150 set based on a design specification of a battery pack 100 or according to the number of the provided supports 170.

Also, when a gap exists between the battery cells 120 and the supports 170, the filling material 130 may surround circumferences of the supports 170 and the battery cells 120 when the filling material 130 is injected. Thus, the filling material 130 may directly or indirectly contact the battery cells 120 through the filling material 130. Thus, although the gap exists between the battery cells 120 and the supports 170, the supports 170 may support the battery cells 120.

Here, a material of the filling material 130 may include silicon. Thus, although the feature of filling the filling material 130 into the space between the battery cells requires much time and costs, the usage amount of the filling material 130 may be decreased by including the cell holder 150 and the supports 170 as described above. Thus, an efficiency of a process of manufacturing the battery pack 100 may be improved.

In accordance with the exemplary embodiment, the battery cells may be supported by installing the plurality of supports in the space between the battery cells. Thus, although the amount of the filling material used to fix the battery cells is decreased, the battery cells may be stably supported. Thus, the efficiency of the process of manufacturing the battery pack may be improved by decreasing the usage amount of the filling material.

Although a preferred embodiment of the present invention has been described in the detailed description of embodiments, various changes and modifications may be made thereto without departing from the scope and spirit of the present invention defined by the appended claims. Therefore, the scope of the invention is defined not by the detailed description of the invention but by the appended claims, and all differences within the scope will be construed as being included in the present invention.

What is claimed is:

1. A battery pack, comprising:
a frame having an inner space and an opened one side;
a plurality of battery cells each having one end disposed in the inner space of the frame and the other end protruding to an outside of the frame through the opened one side of the frame;
a cell holder at one side of the frame and having a plurality of insertion holes to which the other ends of the battery cells are respectively inserted;
a heat sink on the cell holder to cool the battery cells;
a plurality of supports disposed in a portion of a space between the battery cells; and
a filling material filled in a remaining space in which the supports are not disposed in the space between the battery cells,
wherein a filled amount of the filling material is adjusted according to a number of the supports, and
wherein the cell holder includes a plurality of cell holders, and the plurality of cell holders are stacked in a vertical direction.

2. The battery pack of claim 1, wherein each of the supports is disposed along a flat surface shape of the space between the battery cells and extends less than a height of the inner space of the frame.

3. The battery pack of claim 2, wherein the battery cells form groups, wherein corresponding battery cells in each group are disposed along one direction so that the groups are disposed in a row along a direction perpendicularly crossing the one direction, and wherein each of the groups comprises a same number of battery cells.

4. The battery pack of claim 2, wherein the battery cells form groups, wherein corresponding battery cells in each group are disposed along one direction so that the battery cells are alternately disposed in a direction perpendicularly crossing the one direction, and wherein each of the supports has a shape in which a circumference of a flat surface of a corresponding one of the supports has three sides.

5. The battery pack of claim 4, wherein each of the sides of the circumference of the flat surface of the corresponding one of the supports has one of a curved shape or a straight line shape.

6. The battery pack of claim 1, wherein the supports occupy 10% or more to 40% or less of a volume of an entire space between the battery cells.

7. The battery pack of claim 1, wherein the frame has multiple sides, wherein a first side of the multiple sides is closed in that the first side has a side surface extending entirely from a ceiling surface of the frame to a lowest part of the frame, and wherein a second side of the multiple sides is open entirely from the ceiling surface of the frame to the lowest part of the frame.

8. The battery pack of claim 1, wherein the supports extend vertically from a ceiling surface of the frame to a top surface of the cell holder.

9. The battery pack of claim 1, wherein the plurality of cell holders include a first cell holder and a second cell holder stacked in the vertical direction;

wherein an entire lower surface of the first cell holder is planar, and the entire lower surface is coextensive with the first cell holder in plan view;

wherein an entire upper surface of the second cell holder is planar, and the entire upper surface is coextensive with the second cell holder in plan view;

wherein the entire lower surface of the first cell holder is in direct contact with the entire upper surface of the second cell holder.

* * * * *